(12) United States Patent
Robert et al.

(10) Patent No.: US 9,350,949 B2
(45) Date of Patent: May 24, 2016

(54) FLEXIBLE FORMAT MEDIA CONTENT AND METHOD FOR PROVIDING SAME

(75) Inventors: Arnaud Robert, Burbank, CA (US); Scott F. Watson, Marina Del Rey, CA (US)

(73) Assignee: Disney Enterprises, Inc., Burbank, CA (US)

(*) Notice: Subject to any disclaimer, the term of this patent is extended or adjusted under 35 U.S.C. 154(b) by 1319 days.

(21) Appl. No.: 11/906,097

(22) Filed: Sep. 28, 2007

(65) Prior Publication Data

US 2009/0086975 A1 Apr. 2, 2009

(51) Int. Cl.
| | |
|---|---|
| *G06F 15/16* | (2006.01) |
| *H04N 7/173* | (2011.01) |
| *G11B 20/00* | (2006.01) |
| *G11B 20/12* | (2006.01) |
| *H04N 21/2343* | (2011.01) |
| *H04N 21/426* | (2011.01) |
| *H04N 21/432* | (2011.01) |
| *H04N 21/4405* | (2011.01) |
| *H04N 21/4627* | (2011.01) |
| *H04N 21/6334* | (2011.01) |
| *H04N 21/81* | (2011.01) |
| *H04N 21/8355* | (2011.01) |
| *H04N 5/913* | (2006.01) |

(52) U.S. Cl.
CPC ............ *H04N 7/173* (2013.01); *G11B 20/0021* (2013.01); *G11B 20/00086* (2013.01); *G11B 20/00195* (2013.01); *G11B 20/00282* (2013.01); *G11B 20/00855* (2013.01); *G11B 20/1262* (2013.01); *H04N 21/23439* (2013.01); *H04N 21/42646* (2013.01); *H04N 21/4325* (2013.01); *H04N 21/4405* (2013.01); *H04N 21/4627* (2013.01); *H04N 21/63345* (2013.01); *H04N 21/8193* (2013.01); *H04N 21/8355* (2013.01); *H04N 2005/91364* (2013.01)

(58) Field of Classification Search
USPC .......................................................... 380/277
See application file for complete search history.

(56) References Cited

U.S. PATENT DOCUMENTS

| | | | | |
|---|---|---|---|---|
| 5,515,967 | A | * 5/1996 | Fitzsimmons | ..... G11B 33/0438 206/307.1 |
| 6,567,793 | B1 | * 5/2003 | Hicks | ...................... G06F 21/10 380/279 |

(Continued)

FOREIGN PATENT DOCUMENTS

| | | |
|---|---|---|
| JP | 2002-324348 | 11/2002 |
| JP | 2003-297011 | 10/2003 |

(Continued)

*Primary Examiner* — Andrew Goldberg
(74) *Attorney, Agent, or Firm* — Farjami & Farjami LLP

(57) ABSTRACT

There is presented a method for providing a media content, one embodiment comprising recording a first version of a movie on a first content medium in a first format, encrypting one or more content supplement to the movie, each content supplement having a format different from the first format, embedding at least one encryption key in each content supplement, providing a retrieval code for key data enabling playback of the content supplement, and bundling the content supplement and the retrieval code for distribution with the first content medium. In one embodiment, a flexible format media bundle comprises a first content medium, a first version of a media content recorded on the first content medium in a first format, at least one content supplement having a different format, at least one encryption key, and a retrieval code enabling access to the content supplement.

17 Claims, 3 Drawing Sheets

(56) References Cited

U.S. PATENT DOCUMENTS

| | | | |
|---|---|---|---|
| 7,308,698 B1* | 12/2007 | Heughebaert et al. | 725/37 |
| 7,702,536 B1* | 4/2010 | Alabraba et al. | 705/14.16 |
| 2001/0021926 A1* | 9/2001 | Schneck et al. | 705/54 |
| 2001/0034634 A1* | 10/2001 | Ueda | G06Q 30/02 705/26.1 |
| 2002/0091930 A1* | 7/2002 | Kohl et al. | 713/182 |
| 2002/0119293 A1* | 8/2002 | Wynalda, Jr. | G11B 33/045 428/181 |
| 2003/0079222 A1* | 4/2003 | Boykin et al. | 725/31 |
| 2003/0120557 A1* | 6/2003 | Evans et al. | 705/26 |
| 2004/0103427 A1* | 5/2004 | Fritsche et al. | 725/9 |
| 2004/0117608 A1 | 6/2004 | Rothman | |
| 2004/0133794 A1* | 7/2004 | Kocher et al. | 713/193 |
| 2004/0153517 A1* | 8/2004 | Gang et al. | 709/206 |
| 2004/0258242 A1* | 12/2004 | Hsu | 380/210 |
| 2005/0002302 A1* | 1/2005 | Sugimura | G11B 27/329 369/53.21 |
| 2005/0076210 A1* | 4/2005 | Thomas et al. | 713/165 |
| 2005/0091534 A1* | 4/2005 | Nave et al. | 713/201 |
| 2005/0201726 A1* | 9/2005 | Malcolm et al. | 386/94 |
| 2006/0195909 A1* | 8/2006 | Boswell et al. | 726/26 |
| 2007/0008871 A1 | 1/2007 | Nakatani | |
| 2007/0033419 A1* | 2/2007 | Kocher et al. | 713/193 |
| 2007/0043667 A1* | 2/2007 | Qawami et al. | 705/50 |
| 2007/0094583 A1* | 4/2007 | Randall et al. | 715/500.1 |
| 2007/0107063 A1* | 5/2007 | Eckleder | 726/27 |
| 2007/0170078 A1* | 7/2007 | Choi | G11B 33/045 206/308.1 |
| 2007/0195685 A1 | 8/2007 | Read | |
| 2007/0208763 A1* | 9/2007 | Muehlbauer | G06Q 30/00 |
| 2007/0233602 A1* | 10/2007 | Zweig et al. | 705/51 |
| 2007/0250573 A1* | 10/2007 | Rothschild | 709/205 |
| 2008/0005029 A1* | 1/2008 | Ando | 705/51 |
| 2008/0126256 A1* | 5/2008 | Unger | 705/55 |
| 2008/0192936 A1* | 8/2008 | Bellwood et al. | 380/277 |
| 2008/0247542 A1* | 10/2008 | Aylward et al. | 380/201 |

FOREIGN PATENT DOCUMENTS

| | | |
|---|---|---|
| JP | 2004-522199 | 7/2004 |
| JP | 2005-025887 | 1/2005 |
| JP | 2007-519307 | 7/2007 |
| JP | 2007-521602 | 8/2007 |
| WO | WO 01/93262 | 12/2001 |
| WO | WO 02/099558 | 12/2002 |
| WO | WO 2005/002232 | 1/2005 |
| WO | WO 2005/052932 | 6/2005 |
| WO | WO 2007/009876 | 1/2007 |

* cited by examiner

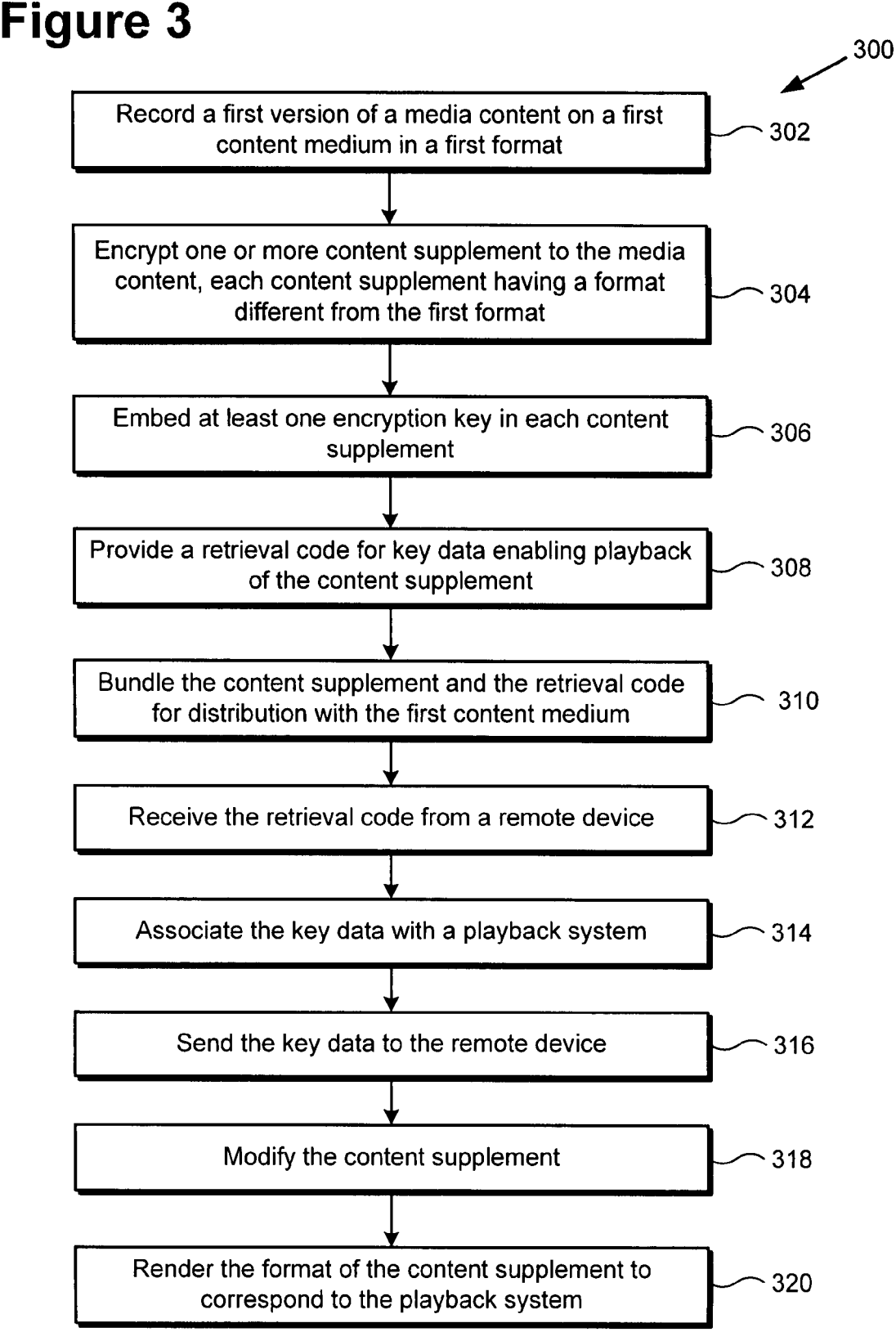

FLEXIBLE FORMAT MEDIA CONTENT AND METHOD FOR PROVIDING SAME

BACKGROUND OF THE INVENTION

1. Field of the Invention

The present invention relates generally to the distribution of media content. More particularly, the present invention relates to the distribution of media content in multiple formats.

2. Background Art

The providers of media content must cater to the interests of at least two sets of constituents. On one hand, media content providers must be responsive to consumer demands for media content in a desirable format. On the other, media content providers must also be sensitive to the concerns of the producers of that content, so that the intellectual property rights associated with their creative works are protected.

In the past, the interests of both media content consumers and media content producers may have been largely aligned, albeit perhaps unintentionally, by the limited formatting options available to support a particular type of media content. Taking entertainment content in the form of a movie as an example, as recently as 1990, the standard format for commercially available movies was analog video home system (VHS), suitable for playback on a video cassette recorder (VCR). Accordingly, in that earlier content distribution environment, consumer demand for commercial entertainment content was apt to focus on a single content format, e.g. VHS video cassettes in the case of movies, so that exercise of intellectual property control over that single format was tantamount to controlling domestic distribution of the entertainment content as a whole. Even where alternative formats were available, as in audio tape versus vinyl recordings of music content, for example, the very distinctness of the physical media embodying the alternative formats facilitated control over distribution of the media content.

More recently, however, format and technology options for the display of entertainment content have multiplied. In addition, a transition from an analog to a digital content world has occurred, in which multiple alternative formats can now be supported on the same type of physical medium. Consumers have responded to the proliferation of available media content formats by ratcheting up their expectations for the variety of presentation modes to be provided as well. Many consumers now desire to obtain access to media content providing a variety of entertainment experiences sharing a central theme, and may expect to be provided with not only a movie, but a music soundtrack for that movie, a video game based on a characters and events of the movie, and other alternative presentation modes, available across multiple media devices, sharing the movie theme.

Due to the greater variety of available content formats and presentation modes, and the heightened expectations of content consumers, the acquisitive interests of consumers are increasingly in conflict with the proprietary interests of content producers, resulting in a dilemma for the content providers who seek to satisfy both groups. Those providers, who wish to promote demand for the creative content their media products contain, strive to maximize the authorized distribution of their products, while avoiding content piracy and other forms of unauthorized access to the various media content.

One conventional approach adopted by media content providers to serve the interests of both consumers and content producers is to offer alternative versions of a particular content, and alternative presentation modes for that content, as separate commercial items. For example, to satisfy consumer demand for a variety of media content formats, a movie may now be sold concurrently as a VHS video cassette, a standard digital video disc (DVD), a high definition DVD (HD-DVD), and as a Blu-ray optical disc. To further satisfy consumer desire for a variety of presentation modes, an audio soundtrack from the movie may be recorded and distributed as a compact disc (CD), for example, while an entertainment game based on the movie may be provided as a video game. To maintain intellectual property control over those various media, however, each content format and presentation mode may be separately recorded, encrypted, and packaged. As a result, a consumer who desires to enjoy the content in more than one format or presentation mode may be required to purchase multiple versions of the same or similar creative content. Consequently, this conventional approach offers a less than optimal solution to satisfying the two sets of interests described.

Another conventional approach adopted by media providers in an attempt to secure the intellectual property interests of content producers is to distribute content in a single format, in a locked mode, accompanied by an activation code allowing an authorized user to unlock the content. Computer software applications are frequently distributed commercially in this way, as secure single format content provided on a computer readable medium, but inaccessible by a user unless the user also possesses the separate activation code, which may be provided as part of the product packaging, for example. The authorized user can unlock the content by submitting the activation code to the content provider, who may then prevent that code from being concurrently utilized by another user. As a result, the content provider, who remains largely powerless to prevent unauthorized physical distribution of the computer readable medium, may nevertheless prevent that activity from resulting in unauthorized access to the creative content recorded on the medium. While effective in protecting content producers by limiting unauthorized access to creative content, this approach does little or nothing to address the interests of content consumers who may desire access to creative content in a variety of formats on the same storage medium, or in alternative formats concurrently.

More recently, United States Patent Application 2007/0195685 by Read ("Read"), describes a solution in which a high density format version of a particular content is recorded on a media disc, the media disc being additionally partitioned to accommodate lower density format versions of the same content. According to the Read disclosure, a Blu-ray disc, for example, on which is recorded a movie formatted for playback on a Blu-ray player, may also contain another version of that same movie formatted for playback on a DVD player. Just as in the conventional approach, however, as an example, Read fails to address the continuing problem of providing consumers with access to interrelated media content having not only a variety of content formats, but a variety of presentation modes as well. As another example, the solution provided by Read incorporates only conventional digital rights management (DRM) schemes for restricting unauthorized distribution of the alternative formats provided on the media disc.

Accordingly, there is a need to overcome the drawbacks and deficiencies in the art by providing media content enabling a consumer to access a particular desired content across a range of content formats and additionally providing access to supplemental content in alternative presentation modes, while concurrently limiting unauthorized access to the media content and its supplemental content.

SUMMARY OF THE INVENTION

A flexible format media content and method for providing same, such as making available multiple media formats in a single package using a back-end system, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing the steps, according to one embodiment of the present invention, by which media content can be provided in multiple formats and presentation modes.

DETAILED DESCRIPTION OF THE INVENTION

The present application is directed to a flexible format media content and method for providing same. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
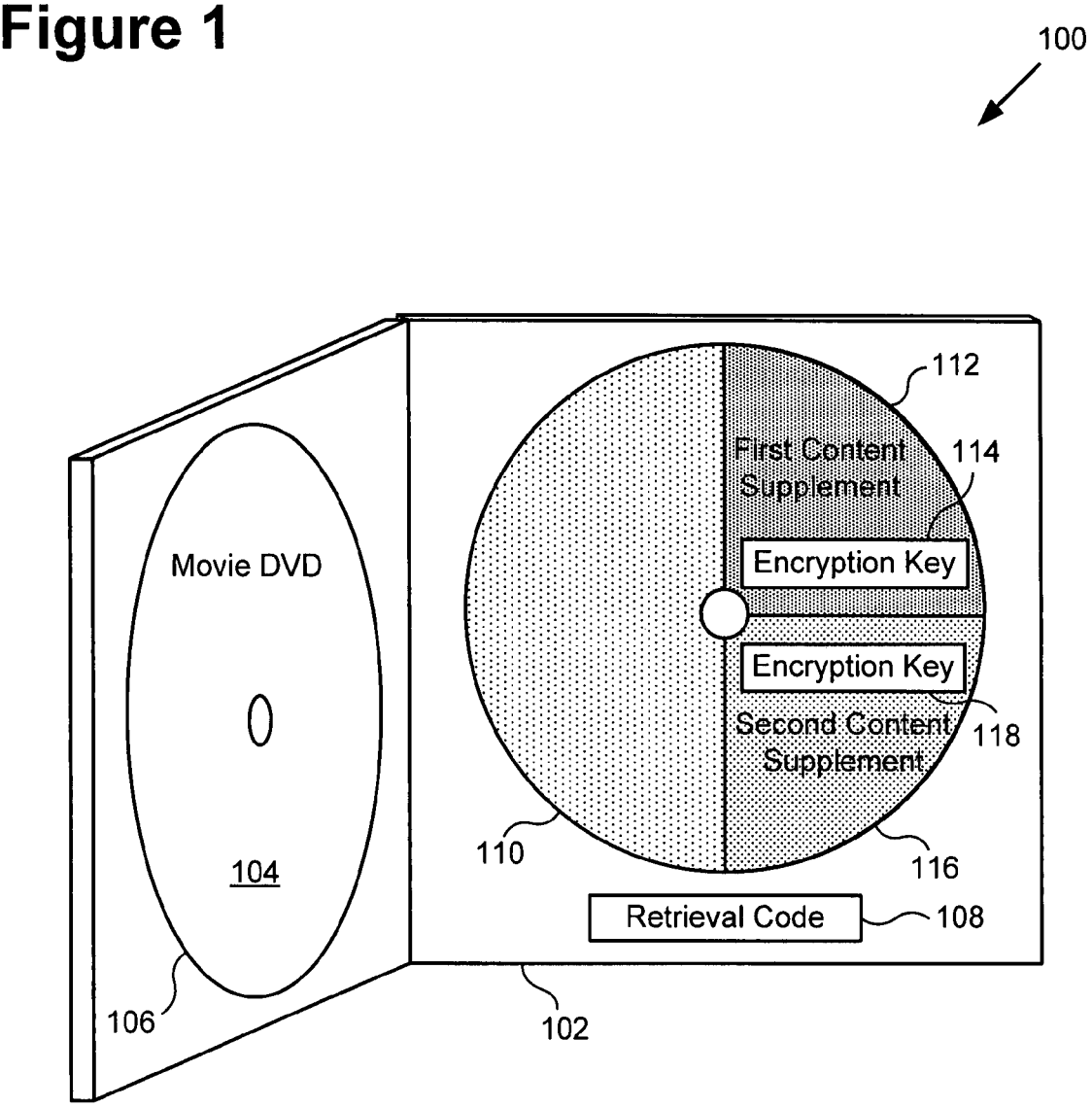
FIG. 1 shows an exemplary media bundle including flexible format media content, according to one embodiment of the present invention.

FIG. 1 shows exemplary media bundle 100 including flexible format media content, according to one embodiment of the present invention. Media bundle 100 comprises media package 102 containing a first version of movie 104, formatted for playback by a digital video disc (DVD) player, on movie DVD 106. Media package 102 also contains retrieval code 108 and supplemental disc 110. Also shown in FIG. 1 are first content supplement 112 including encryption key 114, and second content supplement 116 including encryption key 118.

As shown in FIG. 1, supplemental disc 110 comprising first content supplement 112 and second content supplement 116 is distributed to a consumer of media bundle 100, along with retrieval code 108 and movie DVD 106. According to the embodiment of FIG. 1, movie DVD 106 is an authorized version of movie 104 available for unrestricted playback. First content supplement 112 and second content supplement 116, however, are restricted access content, as indicated by respective encryption keys 114 and 118. First content supplement 112 and second content supplement 116 may be enjoyed by a consumer of media bundle 100 through use of retrieval code 108, which may be utilized to retrieve key data (not shown in FIG. 1) enabling playback of the supplemental content on a particular media device or a set of media devices.

First content supplement 112 is provided in a file format distinct from a first format used to record the first version of movie 104 provided on movie DVD 106. Similarly, second content supplement 116 is provided in a file format distinct from the first format used to provide movie DVD 106. Respective first and second content supplements 112 and 116 may be additional restricted access versions of movie 104, formatted for display on media playback systems other than a DVD player, or they may comprise different content, related to movie 104, but provided for enjoyment in a different presentation mode.

As a more detailed example of a media bundle corresponding to media bundle 100 in FIG. 1, let us assume that movie DVD 106 is a recording of a popular movie associated with a popular music soundtrack. Specifically, let us assume that movie 104 is the movie version of the very popular High School Musical, distributed for sale encased by media package 102 as movie DVD 106. Included with the DVD movie version of High School Musical is supplemental disc 110 comprising another version of the same movie formatted for playback on a system other than a DVD player, as first content supplement 112. First content supplement 112 might comprise a movie version of High School Musical formatted for playback on a portable playback system, such as a video iPod or other video capable digital media player, for example. Also provided on supplemental disc 110 included with movie DVD 106, is second content supplement 116. In the present detailed example, second content supplement 116 comprises, not another version of the movie, but an audio file containing the High School Musical movie soundtrack, suitable for playback on a portable audio system, such as an MP3 player, iPod, or other portable digital audio player.

A consumer of High School Musical movie DVD 106 may or may not desire to access the various supplemental content provided on supplemental disc 110. Where some or all of the supplemental content is desired, retrieval code 108 may be utilized by the consumer to gain access to the supplemental content. Access may be selective, so that a consumer elects to access some, but not all of the content available on supplemental disc 110. Inclusion of encryption keys 114 and 118 in respective first and second content supplements 112 and 116, limits unauthorized distribution of that content.

As a result, for example, the present embodiment makes it possible for a media content provider to offer media bundle 100 for commercial sale at substantially the same price as movie DVD 106, separately packaged and sold alone. Supplemental content may be provided, as shown in FIG. 1, but access to it may be restricted, as indicated by the presence of encryption keys 114 and 118. Where access to the supplemental content is desired, a consumer may utilize retrieval code 108 to, for example, initiate an additional commercial transaction, through which key data permitting access to some or all of the supplemental content can be provided. Where, however, access to the supplemental content is not desired by the consumer, encryption keys 114 and 118 prevent unauthorized access to the supplemental content.

Thus, according to the embodiment of FIG. 1, a consumer of movie DVD 106 may be provided the convenience of enjoying the flexibility in movie format available from first content supplement 112 and/or the flexibility in presentation mode available from second content supplement 116, without being burdened with the cost of that supplemental content if any or all of it is undesirable to the consumer. At the same time, the intellectual property rights of the producers of the supplemental content provided on supplemental disc 112 are protected by access restrictions imposed by encryption keys 114 and 118.

It is noted that although in the embodiment of FIG. 1 retrieval code 108 is located on media package 102, that particular representation was chosen simply to facilitate the present explanation. Retrieval code 108 may be included on movie DVD 106, for example, or on supplemental disc 110. It is further noted that retrieval code 108 may assume many forms. In one embodiment, retrieval code 108 may comprise a simple alphanumeric code imprinted on media package 102, as suggested by FIG. 1, and require manual input by the consumer of movie DVD 106 during a subsequent transaction. In one embodiment, retrieval code 108 may be self-validating, such as a retrieval code including a cyclic redundancy check (CRC), for example. In another embodiment, retrieval code 108 may comprise a self-executing file, such that activation of that file by a consumer may initiate a key data retrieval process. Moreover, although the present embodiment includes single retrieval code 108 for retrieval of either or both first content supplement 112 and second content supplement 116, in other embodiments, there may be provided multiple retrieval codes, and each may correspond to a separate item of supplemental content, for example.

Figure 2:
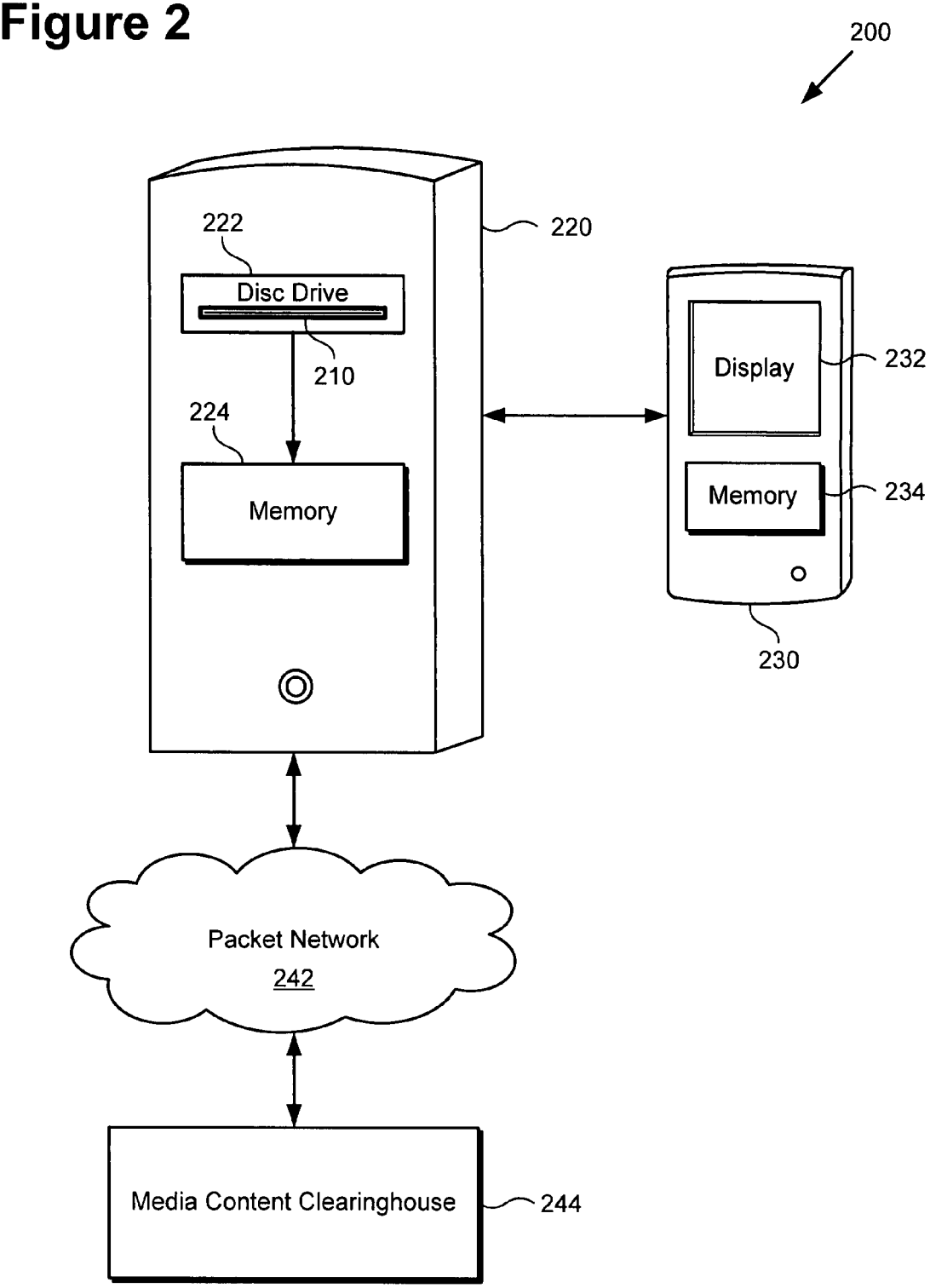
FIG. 2 is a diagram showing an exemplary system for providing a flexible format media content, according to one embodiment of the present invention.

Moving on to FIG. 2, FIG. 2 is a diagram showing exemplary system 200 for providing a flexible format media content, according to one embodiment of the present invention. System 200 in FIG. 2 includes computer 220, playback system 230, packet network 242, and media content clearinghouse 244. As shown in FIG. 2, computer 220 comprises disc drive 222 and computer memory 224. Also shown in FIG. 2 is supplementary disc 210, corresponding the supplementary disc 110 in FIG. 1, being utilized by computer 220 through disc drive 222. In addition, FIG. 2 shows some components of playback system 230, including display 232 and playback memory 234.

As shown in FIG. 2, in the present embodiment, computer 220 is utilized to communicate with media content clearinghouse 244 via packet network 242, such as the Internet, for example. In other embodiments, analogous implementations may include more or less elements than are shown in FIG. 2, and a local services network may mediate communication between computer 220 and media content clearinghouse 244. Further, although FIG. 2 represents supplemental content as being provided on a media disc suitable for use by a computer disc drive, that representation is merely illustrative. In another embodiment, supplemental content may be provided on any computer readable content medium, and may be accessed by any remote device corresponding to computer 220 in FIG. 2, configured to utilize that content medium and communicate, directly or indirectly, with media content clearinghouse 244.

FIG. 2 also shows computer 220 in communication with playback system 230. As is the case for exemplary computer 220, playback system 230 may assume a variety of specific forms. Although in the embodiment of FIG. 2, playback system 230 is shown as a portable device, in another embodiment playback system 230 may be a component of an extensive entertainment system, and lack portability, for example. Playback system 230 may communicate with computer 220 through a wired or wireless communication link. For instance, a WiFi or Bluetooth network may mediate communication between media playback system 230 and computer 220. In one embodiment, playback system 230 is remote from computer 220 and the communication link may be provided by a data network, for example.

Now, system 200 will be further discussed in relation to media bundle 100 in FIG. 1, and the specific example presented previously in which movie DVD 106 contains a movie version of High School Musical. Continuing with FIG. 1 and FIG. 2, let us assume that a consumer of media bundle 100 would like to enjoy, for example, second content supplement 116 provided on supplemental disc 110. As described in conjunction with FIG. 1, the consumer may do so by utilizing retrieval code 108 to retrieve key data enabling access to second content supplement 116. According to the embodiment of FIG. 2, in order to do so, the consumer uses computer 220 to execute a transaction with media content clearinghouse 244, as will be described.

The consumer, having been provided supplemental disc 110 as part of media bundle 100, seeks to access second content supplement 116 comprising a music soundtrack to the movie version of High School Musical, and suitable for playback on playback system 230. To do so, the consumer loads corresponding supplementary disc 210, in FIG. 2, into disc drive 222 on computer 220. The desired supplementary content, i.e. second content supplement 116 including encryption key 118, may then be copied into computer memory 224. The consumer can then communicate with media content clearinghouse 244, engaging in a transaction in which retrieval code 108 is received by media content clearinghouse 244, and key data authorizing access to second content supplement 116 is delivered to computer 220. As a result, second content supplement 116 may be modified, making that content accessible to the consumer. In one embodiment, the transaction resulting in delivery of the key data may include associating the authorized access to second content supplement 116 with the identity of a particular consumer, remote device such as computer 220, or playback system 230, providing additional content protection to the producers of second content supplement 116.

In the present example, the consumer of movie DVD 106 may desire to listen to the movie soundtrack on an iPod corresponding to playback system 230. In such event, the consumer contacts media content clearinghouse 244, which may be the provider of media bundle 100, for example, e.g. Disney in the case of the movie DVD High School Musical. Alternatively, media content clearinghouse 244 may be a third party media content clearinghouse selected on the basis of the media type being accessed. In the present example, in which supplemental content comprising audio files suitable for playback on an iPod are being accessed, a suitable third party media content clearinghouse might be the online iTunes Store, for instance.

Once contact with media content clearinghouse 244 has been established, the consumer may provide retrieval code 108 and receive key data authorizing access to the audio files. Those files can then be copied to playback memory 234 on playback system 230, and enjoyed by the consumer through display 232. According to the present embodiment, the key data can be considered as a user license, authorizing the consumer to access the audio files provided as second content supplement 116 to movie DVD 106. Although in the embodiment of FIG. 2, the supplemental content is described as being copied to computer memory 224 and rendered accessible there upon receipt of key data provided in response to submission of retrieval code 108, that characterization is merely exemplary. In one embodiment, second content supplement 116 including encryption key 118, may then be transferred to playback memory 234 on playback system 230 prior to submission of retrieval code 108. In such embodiment, subsequently provided key data could be used to access the secure audio files directly on playback system 230.

FIG. 3 shows flowchart 300 describing the steps, according to one embodiment of the present invention, by which media content can be provided in multiple formats and presentation modes. Certain details and features have been left out of flowchart 300 that are apparent to a person of ordinary skill in the art. For example, a step may comprise one or more substeps or may involve specialized equipment or materials, as known in the art. While steps 302 through 320 indicated in flowchart 300 are sufficient to describe one embodiment of the present invention, other embodiments of the invention may utilize steps different from those shown in flowchart 300.

Referring to the steps of flowchart 300 in FIG. 3, in conjunction with FIGS. 1 and 2, step 302 of flowchart 300 comprises recording a first version of a media content on a first content medium in a first format. As shown in FIG. 1, the first version of a media content may comprise a movie, whereas the first content medium and first format may be embodied by a DVD carrying MPEG-2 files, for example. Alternatively, a first version of a media content may be an audio book, or a video game. The first content medium may otherwise include a Blu-ray disc, for example, or an external hard drive or flash media storage, while a first format may be any format suitable for playback of the media content by a target playback system. In one embodiment, a second version of the media content is recorded on a second content medium in a second format and provided along with the first version. In such embodiment, for example, a first version of the media content may comprise a DVD recording of a movie, while the second version may comprise a Blu-ray recording of the same movie provided on a Blu-ray disc, or vice versa.

Continuing with step 304 of FIG. 3 and media bundle 100 of FIG. 1, step 304 of flowchart 300 comprises encrypting one or more content supplement to the media content recorded in step 302, each content supplement having a format different from the first format. As described for FIG. 1, first and second content supplements may be encrypted. In other embodiments, only one, or more than two content supplements may be provided.

Step 306 of flowchart 300 comprises embedding at least one encryption key in each content supplement. A content supplement, such as audio files comprised by second content supplement 116 in FIG. 1 may include only one encryption key. Other content supplements may, however, utilize encryption schemes associating a separate encryption key with discrete portions of the particular content supplement. For example, a content supplement comprising a movie might associate an encryption key with a playback time interval of certain duration, and embed as many encryption keys as necessary to span the entire playback time sequence.

At step 308 of flowchart 300, a retrieval code for retrieval of key data enabling playback of the content supplement is provided. As explained previously, there may be one retrieval code common to several content supplements, or in some embodiments, there may be multiple, content supplement specific retrieval codes provided. Also, as described in conjunction with FIG. 1, the retrieval code or codes may each be a simple alphanumeric character string, a self validating code, or comprise an executable file, for example.

Subsequent step 310 comprises bundling the content supplement and the retrieval code for distribution with the first content medium. In FIG. 1, step 310 is embodied by including movie DVD 106, supplemental disc 110 containing first content supplement 112 and second content supplement 116, as well as retrieval code 108, in media package 102, for distribution to a consumer as a single unit. In another embodiment, bundling step 310 may comprise consolidating the media content, content supplement, and retrieval code on a single content medium, for example.

Continuing with step 312 of flowchart 300, step 312 comprises receiving the retrieval code from a remote device. Turning to FIG. 2 for illustration of the present step, step 312 corresponds to receipt at media content clearinghouse 244 of the retrieval code provided by computer 220. As discussed in conjunction with FIG. 2, receiving step 312 may be performed directly, or through utilization of a third party media content clearinghouse.

Step 314 in FIG. 3 comprises associating the key data with a playback system. According to the embodiment of FIG. 2, key data provided by media content clearinghouse 244 might be associated specifically with playback system 230, for example. While the present method associates the key data with a particular playback system, in other embodiments the key data is associated with a more generalized user identity, corresponding, for instance, to a consumer, the remote device utilized to provide the retrieval code, or a personal area network (PAN) comprising the playback system.

In step 316, the key data is sent to the remote device. Returning to FIG. 2 for illustration of the present step, in step 316, media content clearinghouse 244 sends key data to computer 220. As described previously, key data may comprise a user license authorizing playback of a particular encrypted content supplement by a particular consumer, or on a particular playback system, for example.

Continuing with step 318, step 318 of flowchart 300 comprises modifying the content supplement through supply of the key data. Modification of the content supplement may include decryption and re-encryption of the supplemental content, transformation of the file format, changes in the encoding format, or any combination of those alterations.

In step 320, the content supplement may be suitably rendered for playback on the playback system associated with the key data in step 314. Where the key data is associated with a single device, for example, the content supplement may be rendered in a single format suitable for playback on that device. Where the key data is associated with a more general user identity as described in conjunction with step 314, however, the content supplement may be rendered for playback in multiple formats corresponding to the alternative playback options comprised by the user identity.

As described in the foregoing, a flexible format media content provides a means for content distribution serving the interests of consumers and content producers alike. By providing supplemental content suitable for playback across a variety of presentation modes using a range of file formats, the preference of content consumers for flexibility and choice in their enjoyment of media content may be satisfied. By encrypting the supplemental content and enabling consumers to selectively access desired formats and presentation modes, the financial burden on the consumer may be rendered proportional to the variety and scope of the content consumed. At the same time, the provided encryption limits unauthorized access to or distribution of creative content, thereby protecting the intellectual property interests of its producers, and encouraging their further creative efforts.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for providing a movie, the method comprising:
recording a first version of the movie in a first file format;
encrypting one or more content supplement to the movie using at least one encryption key to provide one or more encrypted content supplement to the movie, each of the one or more encrypted content supplement to the movie having a file format different from the first file format;
providing a retrieval code corresponding to the one or more content supplement for submission to a media content clearinghouse to retrieve a key data for enabling playback of each of the one or more encrypted content supplement to the movie, and
bundling the one or more encrypted content supplement with the movie and the retrieval code for distribution, wherein playback access to the movie is unrestricted, and wherein playback access to the one or more encrypted content supplement to the movie is restricted and can become unrestricted using the key data retrieved by submission of the retrieval code;
wherein the bundling includes storing the one or more content supplement and the retrieval code in each of a plurality of second content media, and wherein the retrieval code is stored in a self-executing file.

2. The method of claim 1, wherein the key data comprises a user license.

3. The method of claim 1 further comprising:
receiving the retrieval code from the remote device for retrieving the key data; and associating the key data with a person's identity.

4. The method of claim 1, wherein the movie is in the first file format for playback access by a first device, and the one or more encrypted content supplement to the movie has the file format different from the first file format for playback access by a second device different than the first device, and wherein the first file format is not playable by the second device.

5. The method of claim 4, wherein the first device is a DVD player, and the second device is an iPod.

6. The method of claim 1, wherein the bundling stores a plurality of retrieval codes including the retrieval code and a plurality of content supplements including the one or more content supplement in each of the plurality of second content media.

7. A method for providing a media content, the method comprising:
recording a first version of the media content in a first file format;
encrypting one or more content supplement to the media content using at least one encryption key to provide one or more encrypted content supplement to the media content, each of the one or more encrypted content supplement to the media content having a file format different from the first file format;
providing a retrieval code corresponding to the one or more content supplement for submission by a remote device to a media content clearinghouse to retrieve a key data for enabling playback of each of the one or more encrypted content supplement to the media content, and
bundling the one or more encrypted content supplement with the media content and the retrieval code for distribution, wherein playback access to the media content is unrestricted, and wherein playback access to the one or more encrypted content supplement to the media content is restricted and can become unrestricted using the key data retrieved by submission of the retrieval code;
wherein the bundling includes storing the one or more content supplement and the retrieval code in each of a plurality of second content media, and wherein the retrieval code is stored in a self-executing file.

8. The method of claim 7, wherein the key data comprises a user license.

9. The method of claim 7, wherein recording the first version of the media content stores the first version of the media content in each of a plurality of first content media different than the plurality of second content media.

10. The method of claim 7 further comprising receiving the retrieval code from the remote device for retrieving the key data.

11. The method of claim 10, wherein the receiving of the retrieval code is performed by the media content clearinghouse.

12. The method of claim 11 further comprising utilizing the media content clearinghouse to send the key data to the remote device.

13. The method of claim 10 further comprising associating the key data with a person's identity.

14. The method of claim 10 further comprising sending the key data to the remote device.

15. The method of claim 10 further comprising transforming the file format of the one or more encrypted content supplement to the media content.

16. The method of claim 7, wherein the bundling stores a plurality of retrieval codes including the retrieval code and a plurality of content supplements including the one or more content supplement in each of the plurality of second content media.

17. A flexible format media bundle comprising:
a first content medium;
a first version of a media content, the first version of the media content recorded on the first content medium and having a first file format;
at least one content supplement to the media content, each of the at least one content supplement to the media content having a file format different from the first file format;
a retrieval code corresponding to the one or more content supplement for submission by a remote device to a media content clearinghouse to retrieve a key data for enabling access to the at least one content supplement to the media content;
wherein the retrieval code, the first content medium, and the at least one content supplement to the media content are bundled as a package for distribution as a unit, wherein playback access to the media content is unrestricted, and wherein playback access to the one or more encrypted content supplement to the media content is restricted and can become unrestricted using the key data retrieved by submission of the retrieval code;
wherein the one or more content supplement and the retrieval code are stored in each of a plurality of second content media, and wherein the retrieval code is stored in a self-executing file.

* * * * *